(12) United States Patent
Jain et al.

(10) Patent No.: US 9,984,589 B2
(45) Date of Patent: May 29, 2018

(54) TACTILE MEASURING INSTRUMENT

(71) Applicants: Pranay Jain, Delhi (IN); Anshul Singhal, Ghaziabad (IN)

(72) Inventors: Pranay Jain, Delhi (IN); Anshul Singhal, Ghaziabad (IN)

( * ) Notice: Subject to any disclaimer, the term of this patent is extended or adjusted under 35 U.S.C. 154(b) by 722 days.

(21) Appl. No.: 14/583,479

(22) Filed: Dec. 26, 2014

(65) Prior Publication Data
US 2015/0243189 A1    Aug. 27, 2015

Related U.S. Application Data

(60) Provisional application No. 61/920,838, filed on Dec. 26, 2013.

(51) Int. Cl.
*G09B 21/00*    (2006.01)
*G01B 3/10*    (2006.01)

(52) U.S. Cl.
CPC ............. *G09B 21/004* (2013.01); *G01B 3/10* (2013.01); *G09B 21/00* (2013.01)

(58) Field of Classification Search
CPC ......... G09B 3/00; G09B 21/00; G09B 2/0031
USPC .................................... 434/112, 113; 33/700
See application file for complete search history.

(56) References Cited

U.S. PATENT DOCUMENTS

| | | | | |
|---|---|---|---|---|
| 2,289,717 A | * | 7/1942 | Montgomery | G06G 1/04 235/70 B |
| 3,757,320 A | * | 9/1973 | Heath | G01B 3/205 33/1 D |
| 4,283,178 A | * | 8/1981 | Tetzlaff | G09B 21/003 434/114 |
| 4,328,618 A | * | 5/1982 | Belanger | G01B 3/02 33/700 |
| 4,614,042 A | * | 9/1986 | Maurer | G09B 19/24 33/494 |
| 4,633,121 A | * | 12/1986 | Ogawa | G09B 21/003 310/331 |
| 5,766,014 A | * | 6/1998 | Ida | G09B 21/004 434/112 |

(Continued)

FOREIGN PATENT DOCUMENTS

| | | | |
|---|---|---|---|
| CN | 202166368 U | * | 3/2012 |
| CN | 104180735 A | * | 12/2014 |

(Continued)

*Primary Examiner* — Eddy Saint-Vil
*Assistant Examiner* — William Ermlick

(57) ABSTRACT

A tactile measuring instrument to be used primarily to measure and produce geometric quantities without use of sight, wherein a sliding jaw is configured to move over a guide to adjust the instrument to desired measurement, a mechanically controlled display mechanism is configured to place within tactile perception selected tactile forms or Braille dots, and condensed representation of tactile forms is configured to control display mechanism such that the numerical value of measurement is displayed; and because tactile forms are condensed and more may be packed in the same area, the instrument has high precision. As the display mechanism is small, lightweight and hidden, the instrument is small, portable and simple; and as all information is presented in Braille, it is quick-to-use and convenient. With different configurations of display mechanism and condensed tactile forms, the device may be used for applications other than measurement as well.

19 Claims, 19 Drawing Sheets

(56) References Cited

U.S. PATENT DOCUMENTS

| | | | | |
|---|---|---|---|---|
| 8,438,744 B1* | 5/2013 | Mann | ............... | G01B 3/002 |
| | | | | 33/491 |
| 8,483,018 B2* | 7/2013 | Anderson | ............ | G09B 21/003 |
| | | | | 368/230 |
| 9,613,544 B2* | 4/2017 | Yang | ............... | G09B 21/004 |
| 2002/0172927 A1* | 11/2002 | Faulkner | ............ | G09B 5/00 |
| | | | | 434/169 |
| 2007/0124950 A1* | 6/2007 | Wirtz | ............... | G01B 3/1082 |
| | | | | 33/759 |
| 2009/0023116 A1* | 1/2009 | Shaw | ............... | G09B 21/003 |
| | | | | 434/114 |
| 2012/0188192 A1* | 7/2012 | Sano | ............... | G06F 3/011 |
| | | | | 345/173 |
| 2016/0061574 A1* | 3/2016 | Saito | ............... | G01B 3/205 |
| | | | | 33/811 |

FOREIGN PATENT DOCUMENTS

| | | | | |
|---|---|---|---|---|
| CN | 204263780 U | * | 4/2015 | |
| CN | 204373529 U | * | 6/2015 | |
| CN | 105716489 A | * | 6/2016 | |

* cited by examiner

TACTILE MEASURING INSTRUMENT

CROSS-REFERENCE TO RELATED APPLICATIONS

This application claims the benefit of U.S. Provisional Patent Application No. 61/920,838, filed Dec. 26, 2013, the disclosure of which is incorporated herein by reference.

FEDERALLY SPONSORED RESEARCH

Not Applicable

FIELD OF THE INVENTION

The present invention relates to measuring instruments to enable reading of measurements by identification of tactile forms and features, and more particularly, but not exclusively, by identification of Braille characters. Although the first embodiment of the measuring instrument uses a rigid linear guide to measure distances along straight lines, other embodiments may use a rigid angular guide, for example, to measure angles or non-rigid guides, for example, to measure distances along non-uniform lines. Although the discussed embodiments of the measuring instruments display measurements in Braille, other embodiments may display measurements in other appropriate tactile forms consisting of, but not limited to, dots, lines, shapes and textures.

The present invention also relates to mechanical tactile displays to enable condensed representation of tactile forms on a surface, and to enable rendering, of the said condensed representation, to discernable tactile forms for a user to read or perceive. Although the discussed embodiments of the mechanical tactile display are as measuring instruments, other embodiments may be as devices with said mechanical tactile displays for applications other than measurement.

BACKGROUND OF THE INVENTION

There are a number of traditional tactile measuring instruments available that are used by persons with blindness to measure lengths and angles in order to interpret or produce geometric features and constructions. Available as rulers and protractors, such instruments have tactile markings permanently etched, embossed or engraved on their surface. Adjacent tactile markings are spaced adequately so that users are able to distinguish between them by touch. Traditional instruments are therefore limited in precision. Precision of an instrument is related to its least count, which is the smallest change in measured dimension that can be resolved with the use of the instrument. Precision is higher for instruments with relatively smaller least counts. Least count of traditional tactile rulers is usually equal to or greater than half of a centimeter or to one-fourth of an inch, depending on the unit of measurement. That of traditional tactile protractors is usually equal to or great than five degrees. A few that have smaller least counts are difficult to use by touch. Some such traditional instruments also have embossed Braille characters accompanying the tactile markings to indicate the value of measurement at corresponding markings Due to the size of Braille characters and the limited space available, they accompany only some select markings. For other markings, value of the measurement is identified by counting the number of preceding markings To a Braille user, counting may be slower than reading Braille and may require more mental effort and concentration. Thereby, the use of traditional instruments is slow and inconvenient.

A few tactile measuring instruments give precision higher than that of the traditional ones. Some such rulers have a threaded shaft with pitch length equal to the desired least count. Auditory or tactile cues are generated mechanically with each rotation of the shaft. These cues are counted to identify the measurement. Other such rulers, as described in U.S. Pat. No. 4,328,618 and U.S. Pat. No. 4,614,042, use gauge elements or tabs with one physical dimension equal to the least count. Unlike traditional tactile measuring instruments, such instruments may have a smaller least count and therefore higher precision. However, they are usually larger and heavier. Further, Braille characters, if any, indicate only coarse values of measurement. Fine values of measurement are still identified by counting tactile markings or auditory cues. Thereby, similar to traditional instruments, their use is also slow and inconvenient.

Some measuring instruments have electronic systems that read out measurements either as discrete beeps or as synthetic speech. Compared to tactile measuring instruments, these auditory instruments have a higher accuracy. However, they run on a battery or an external power source, and are not suitable for all environments and situations of use. For instance, they are difficult to use in noisy environments and also when the user has other active sources of auditory information. Further, they are usually more expensive and delicate.

The technique and designs of this invention, on the other hand, readily and simply overcome these limitations both in the area of tactile measuring instruments and in the more general area of condensed representation of tactile forms. They preferably involve the use of a guide, a sliding jaw and a display mechanism for presenting values of measurements in Braille or other appropriate tactile forms. They are such that the accuracy of measurement is not limited either by the user's ability to distinguish between adjacent tactile markings or by the size of Braille characters. The effect of this is that the instruments may have a smaller least count and therefore higher precision. Braille characters, or other appropriate tactile forms, indicate the complete value of measurement rather than only the coarse value. This overcomes the need to count individual markings, which otherwise makes instruments slow and inconvenient to use. Auditory cues, generated with every change of measurement, supplement the tactile output. This informs users of desired or undesired changes in measurement and thereby prevents errors. With only a few small parts, the instrument is not large and heavy. Unlike measuring instruments with electronic systems, it does not require a battery or an external power source. Also, it is not as expensive and is less delicate. Further, it can be used even in noisy environments and also when users have other active sources of auditory information.

SUMMARY

An object of the present invention is to provide a novel method or technique for tactile measurement for attaining above described novel features while obviating the limitations of prior instruments of this type.

Another object of the present invention is to provide such novel tactile measuring instruments that can be operated without the use of sight, to measure geometric quantities for interpreting existing geometric features or to produce new ones.

Yet another object of the present invention is to provide, through examples of tactile measuring instruments, a novel method or technique for condensed representation of tactile forms on a surface, and for rendering of the said condensed representation to discernable tactile forms.

Accordingly, in the present invention there is provided a tactile measuring instrument wherein a display mechanism functions in accordance with the value of measurement and places appropriate tactile forms that indicate the value, within tactile perception. In one embodiment, the instrument has a sliding jaw that may move over a guide to correspond to a measured length. A display mechanism attached to the sliding jaw controls the position of multiple Braille dots and selectively places them within or without tactile perception. The Braille dots that are positioned within perception are selected according to a condensed representation of Braille numbers on the guide. The numbers correspond to the value of measurement or a part of the value. A user tactually reads the numbers displayed in Braille to accurately interpret the measurement.

As tactile forms are represented on the guide in a condensed manner, more tactile forms can be packed in the same area. This allows a higher precision in tactile measuring instruments compared to traditional instruments. As the mechanism to render the condensed tactile forms into tactually readable forms is small, lightweight and hidden, the instruments are small, portable and simple. As all information is presented preferably in Braille, the instruments are quick and convenient to use. Further, as the mechanism is not reliant on electronic systems, it is low-cost and independent from power sources.

Additional objects and advantages of the present invention will be brought forward in and in part will be obvious from the drawings, the brief description and the detailed description herein.

DRAWINGS

The present invention can be best understood in conjunction with the accompanying drawings, in which.

Figure 1:
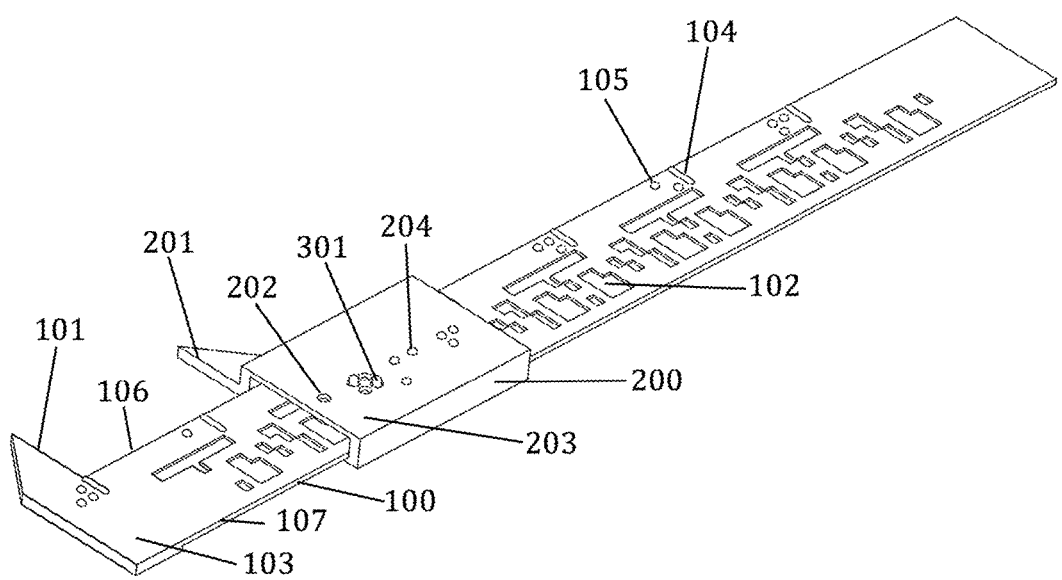
FIG. 1 is a perspective view of a tactile measuring instrument formed as a linkage of a rigid linear guide and a sliding jaw in accordance with one embodiment.

In the drawings, embodiments of the invention are illustrated by way of example, it being expressly understood that the description and drawings are only for the purpose of illustration and preferred designs, and are not intended as a definition of the limits of the invention.

DETAILED DESCRIPTION

Figure 2:
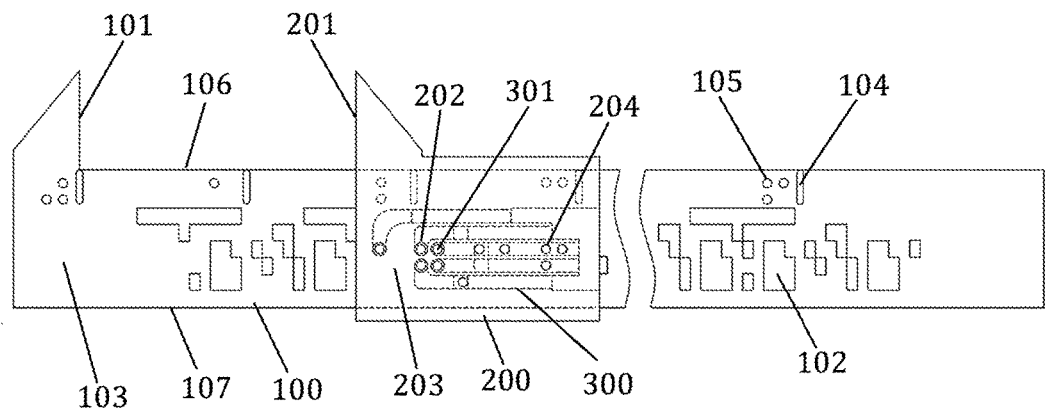
FIG. 2 is an orthographic projection in top view of the tactile measuring instrument of FIG. 1.

First embodiment of the present invention is a tactile measuring instrument to measure length along a straight line and to draw straight lines of known lengths. FIG. 1 is a perspective view of this embodiment formed as a linkage between rigid linear guide 100 and sliding jaw 200, shown with measuring contact 201 at a distance from measuring contact 101 of guide 100. FIG. 2 is an orthographic projection in top view of the first embodiment. Display mechanism 300 is linked to sliding jaw 200 and is in physical contact with track 102 on top surface 103 of guide 100. Braille pins 301 of display mechanism 300 are concentric with through holes 202 on display surface 203 of sliding jaw 200. Braille characters 204 are permanently embossed on display surface 203. Track 102 is composed of appropriate elevations and depressions etched, embossed or engraved on top surface 103 of guide 100. Tactile markings or divisions 104 are marked on top surface 103 along back edge 106. Braille characters 105 are permanently embossed along each division 104.

Figure 3:
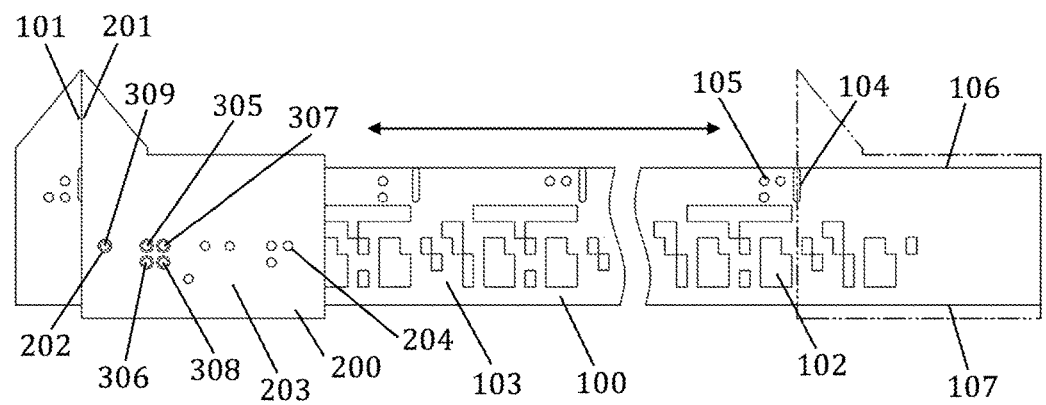
FIG. 3 is an orthographic projection in top view of the tactile measuring instrument of FIG. 1, illustrating range of movement of sliding jaw relative to guide.

FIG. 3 is an orthographic projection in top view of the first embodiment illustrating the range of movement of sliding jaw 200 with respect to guide 100. Sliding jaw 200 rests and slides on sliding contacts, not shown, along back edge 106 and front edge 107 of guide 100. Distance between measuring contacts 101 and 201 along back edge 106 corresponds to the measured length. Sliding jaw 200 may be moved relative to guide 100 to change this distance. The maximum length that ought to be measured determines the range of motion. Accordingly, length of the guide may be equal to or different from the length of guide 100 of the first embodiment. In operation, guide 100 may be held stationary against a plane on its back surface, not shown, or held in the user's hand and force may be applied on sliding jaw 200. Component of the force parallel to edges 106 and 107 of guide 100 may move it in a direction towards and not beyond positions illustrated in FIG. 3. Similarly, sliding jaw 200 may be held in the user's hand and force may be applied on guide 100 to move it in either direction.

For the purpose of precision, a measurement is split into coarse and fine measurements with different least counts. For measurement of length in imperial system of units, coarse measurements can be in whole inches and fine measurements can be in fractions of an inch. For metric units, coarse measurements can be in whole centimeters and fine measurements in millimeters or fractions of a centimeter. In the first embodiment, length is measured in imperial units and therefore, coarse measurements are in inches and fine measurements in sixteenths of an inch. The least count of coarse measurements is one inch and that of fine measurements is one-sixteenth of an inch. Alternative designs, not shown, of the first embodiment may have different unit systems and least counts of coarse and fine measurements. In the first embodiment, coarse measurements are read from top surface 103 of guide 100 and fine measurements are read from display surface 203 of sliding jaw 200. Alternative designs, not shown, may have both the coarse and fine measurements read from the display surface of the sliding jaw.

In the first embodiment, coarse measurements are indicated with tactile markings or divisions 104 and corresponding Braille characters 105. First of divisions 104 has its center aligned with the edge of measuring contact 101. The corresponding Braille character reads as number zero. Subsequent divisions 104 are spaced so that their centers are precisely at all whole inches from the center of the first division. Braille characters 105 next to each division read as numbers indicating corresponding divisions' distance from the first division in inches. In an alternative design, not shown, for measurement of length in metric units, the divisions may be spaced at whole centimeters and Braille characters may indicate the distance accordingly. In other alternative designs, not shown, tactile markings or divisions may be marked on surfaces other than the top surface, along edges other than the back edge, along multiple edges, or not along any particular edge. Braille characters, or other tactile or visual features, may accompany the markings.

In the first embodiment, fine measurements are indicated as fractions with numerator, slash sign and denominator in Braille. Braille pins 301, of which only some select pins are within perception when display surface 203 is touched, present the numerator. In the first embodiment, the select pins form appropriate numbers, from zero to fifteen. They are determined and operated by the interaction of display mechanism 300 and track 102. Embossed Braille characters 204 on display surface 203 form the slash sign and the denominator. The denominator is sixteen in the first embodiment. In an alternative design, not shown, for measurement of length in metric units, the select pins may form numbers from zero to nine and the denominator may be ten. In other alternative designs, not shown, the fine measurement may be displayed in forms other than fractions. Embossed Braille characters on display surface may be read as characters other than slash signs or numerals, or may be absent altogether.

Figure 4:
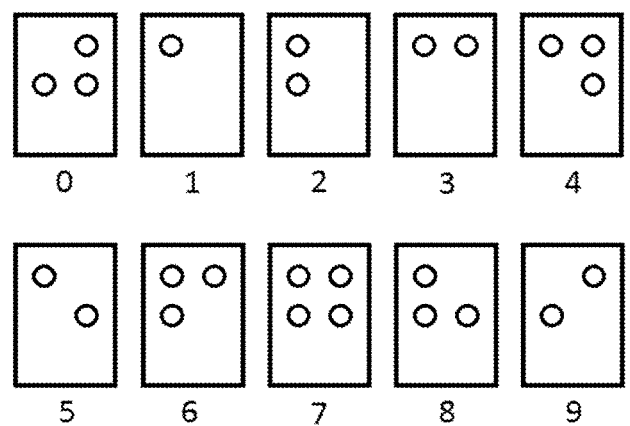
FIG. 4 is an illustration of the representation of numerical digits in Braille.

Braille characters are formed by spatial arrangements of one or more tactile dots. For any Braille script standard, characters have unique arrangements of dots. All characters can be shown with a maximum of six dots (or eight dots in some codes and standards) distributed in two columns and three rows (or two columns and four rows in some standards). Characters in a line and lines of multiple characters are spaced according to standards in order to be distinguishable by touch. Numerical digits and mathematical symbols are also represented in Braille. FIG. 4 is an illustration of the representation of numerical digits zero to nine in Braille. The circles represent raised dots that form the digits. According to many Braille script standards, representation of numerical digits requires a maximum of four dots, in two columns and two rows, per digit. In alternative designs, not shown, Braille codes and standards other than those employed in the first embodiment may be used to represent characters in Braille.

In the first embodiment, as illustrated in FIG. 3, Braille pins 305-309 and through holes 202 are in a certain layout so as to display any number from zero to fifteen on display surface 203. Four Braille pins 305-308 may display any number from zero to nine. Braille pin 309 may display either display no number or only the number one. As value of fine measurement changes with movement of sliding jaw 200 relative to guide 100, Braille pins 305-309 appropriately move between upward and downward positions, and thereby within or without perception, to change the displayed fine measurement. A user may find it convenient to have the display change dynamically as measured distance changes. In alternative designs, not shown, the user may have the choice to control when the Braille pins display or when they change.

Figure 5:
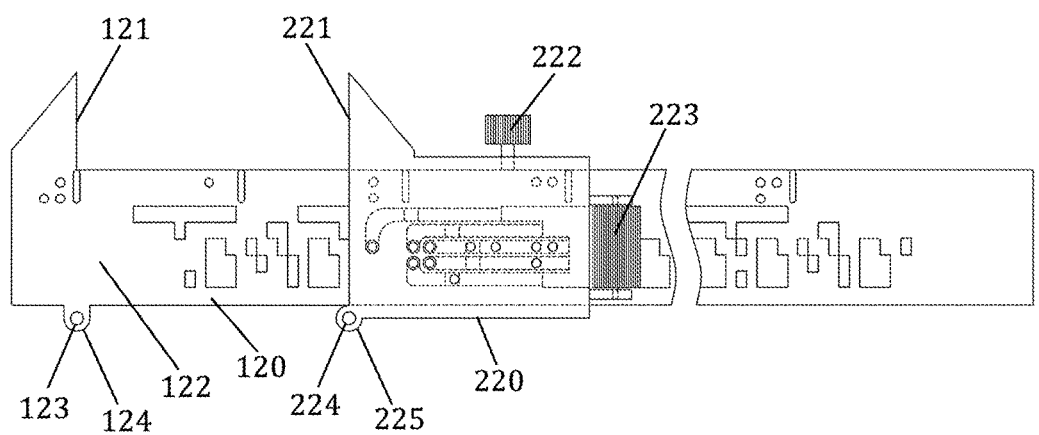
FIG. 5 is an orthographic projection in top view of an alternative design of tactile measuring instrument.

FIG. 5 is an orthographic projection in top view of an alternative design of the first embodiment. It is shown with a finite distance between measuring contact 121 of guide 120 and measuring contact 221 of sliding jaw 220. The figure illustrates features that add to the first embodiment's function and usability. Locking screw 222 may be used to lock sliding jaw 220 at any position within range of movement relative to guide 120. In other embodiments, not shown, clips, pins, pawls, compliant members or alternatives of the like may be used to similarly lock or partially restrain sliding jaw 220 at any position. Roller 223 is attached to sliding jaw 220. When roller 223 is in frictional contact with top surface 122 of guide 120 and is rotated, it may move sliding jaw 220 with respect to guide 120. The direction of motion depends on the direction of rotation of roller 223. A user may use roller 223 to change measured distance slowly. In alternative designs, not shown, the roller may be in frictional contact with front or the back surfaces, not shown, or may be replaced with a pinion over a rack or alternatives of the like for the same or similar function. Through hole 123 in projection 124 on guide 120 and through hole 224 in projection 225 on sliding jaw 220 may be used to calibrate other measuring and drawing instruments with pointed or needle-like ends, drawing compass for example, to the measured length. The distance between centers of through holes 123 and 224 is equal to that between measuring contacts 121 and 221. Projections 124 and 225 may be in different planes so that they align when measuring contacts 121 and 221 are in contact.

Figure 6:
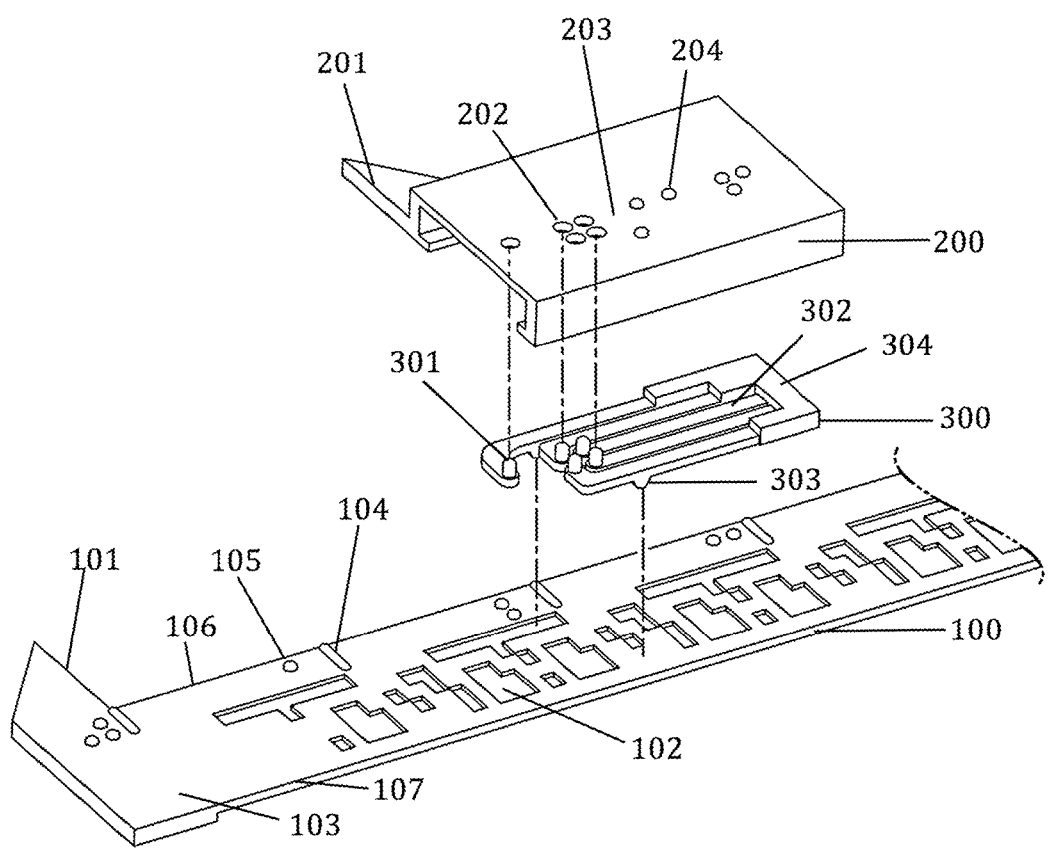
FIG. 6 is an exploded view of the tactile measuring instrument in FIG. 1.

FIG. 6 is an exploded view of the first embodiment. The figure illustrates the structure of display mechanism 300 and its position and orientation with respect to sliding jaw 200 and guide 100. In display mechanism 300, Braille pins 301 and teeth 303 are physically attached to, or are parts of, respective members 302. All members 302 are attached to, or are parts of, base 304. Display mechanism 300 is assembled with sliding jaw 200. For the purpose of assembly, base 304 of display mechanism 300 is attached to sliding jaw 200 by the use of adhesives, mechanical fasteners, snap-fits, or other joining technique of the like. The assembly is such that Braille pins 301 and through holes 202 are concentric. The subassembly of display mechanism 300 and sliding jaw 200 is further assembled with guide 100. The assembly is such that sliding jaw 200 may slide along guide 100 and teeth 303 may rest on track 102 in individual rows. The sliding jaw may be retained on the guide using physical constraints, not shown, such as snap fits, clips, pins, pawls, compliant members or alternatives of the like. In alternative designs, not shown, the assembly sequence may be different and sliding jaw and display mechanism may be fabricated as a single part.

Figure 7A:
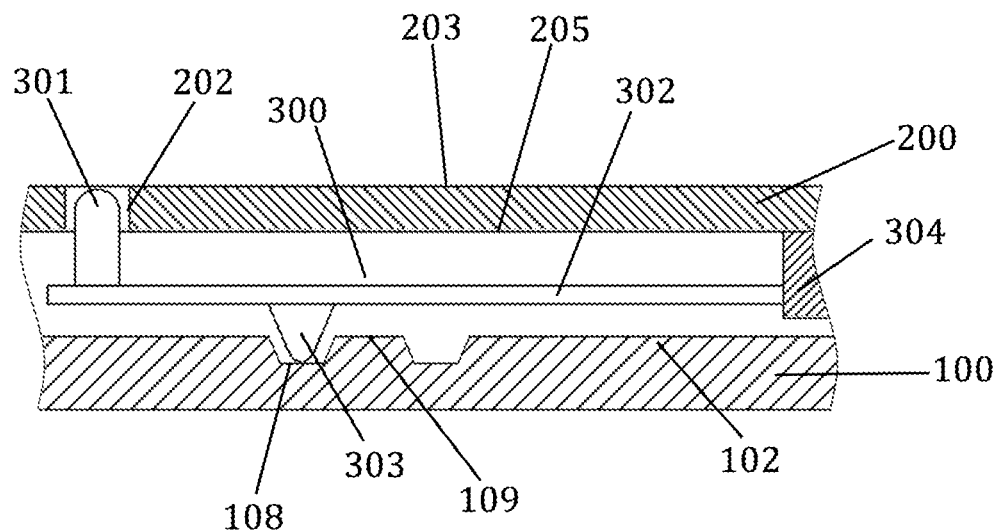
FIG. 7A is a partial sectional view of the tactile measuring instrument in FIG. 1, showing display mechanism with a Braille pin in downward state.
Figure 7B:
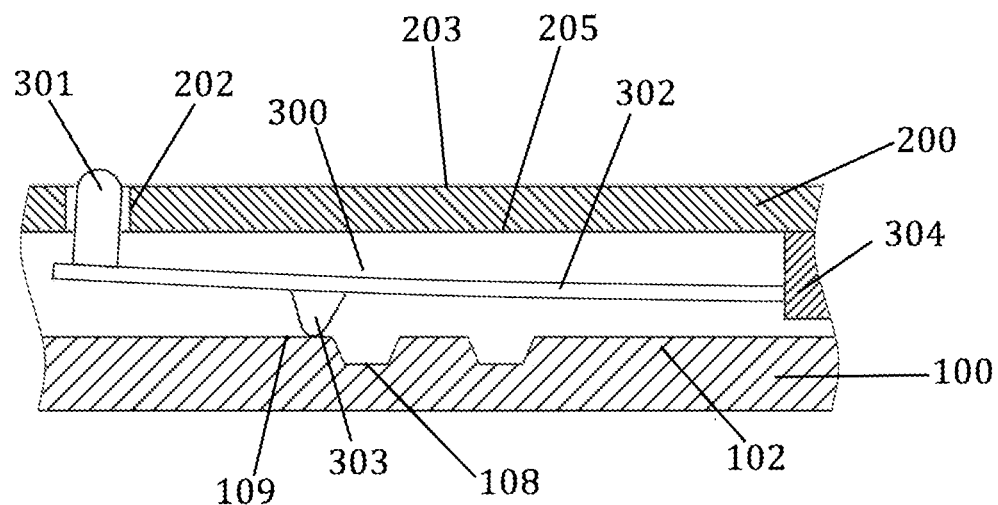
FIG. 7B is a partial sectional view showing display mechanism of FIG. 7A with a Braille pin in upward state.

FIGS. 7A and 7B are partial sectional views of the first embodiment. They illustrate the working of display mechanism 300 by showing a member 302, a Braille pin 301 and a tooth 303 with respect to sliding jaw 200 and guide 100. In FIG. 7A Braille pin 301 is in downward position and not perceivable to touch on display surface 203. Tooth 303 rests on land 108 in track 102. In FIG. 7B Braille pin 301 is in upward position and perceivable to touch on display surface 203. Tooth 303 rests on bench 109 in track 102. Track 102 is composed of lands 108 and benches 109, which are surfaces on two separate parallel planes. Member 302 connects tooth 303 and Braille pin 301 in such a way that when tooth 303 rests on land 108, Braille pin 301 is in the downward position, and when tooth 303 rests on bench 109, Braille pin 301 is in the upward position. In the first embodiment, member 302 is compliant and is rigidly attached to, or is a part of, base 304. It bends approximately as a beam in response to strain applied at tooth 303. The resting position of tooth 303 changes between bench 109 and land 108 as display mechanism 300, attached to sliding jaw 200, moves with respect to track 102 of guide 100. With the change in resting position, the strain applied on compliant member 302 changes and as a result, the member's bending profile changes. With it the position of Braille pin 301 changes with respect to display surface 203.

The display mechanism 300, and particularly compliant member 302 are designed to facilitate proper display function. For proper function, Braille pins 301 should move a certain minimum distance between upward and downward positions. The distance is determined by the height of Braille pins specified in the chosen Braille standard, and additionally by the preferred clearance below display surface 203. Further, Braille pins 301 should require a certain minimum downward force to be displaced from their upward position. This force is usually a result of pressure applied by fingers when observing the display surface by touch. A recommended minimum downward force is thirty grams per Braille dot. With appropriate materials, dimensions and cross-sectional shape of members 302, and appropriate positions of teeth 303 and Braille pins 301 on members 302, the requirements can be easily met. Deriving these parameters to be appropriate is obvious to those skilled in the art. In the first embodiment, members 302 preferably have a rectangular cross section and are composed of a polymer, a metal, or a combination of both. For appropriate stiffness, compliant members 302 may have a bent or twisted natural position, not shown, and may act as a spring to the applied strain.

Figure 8:
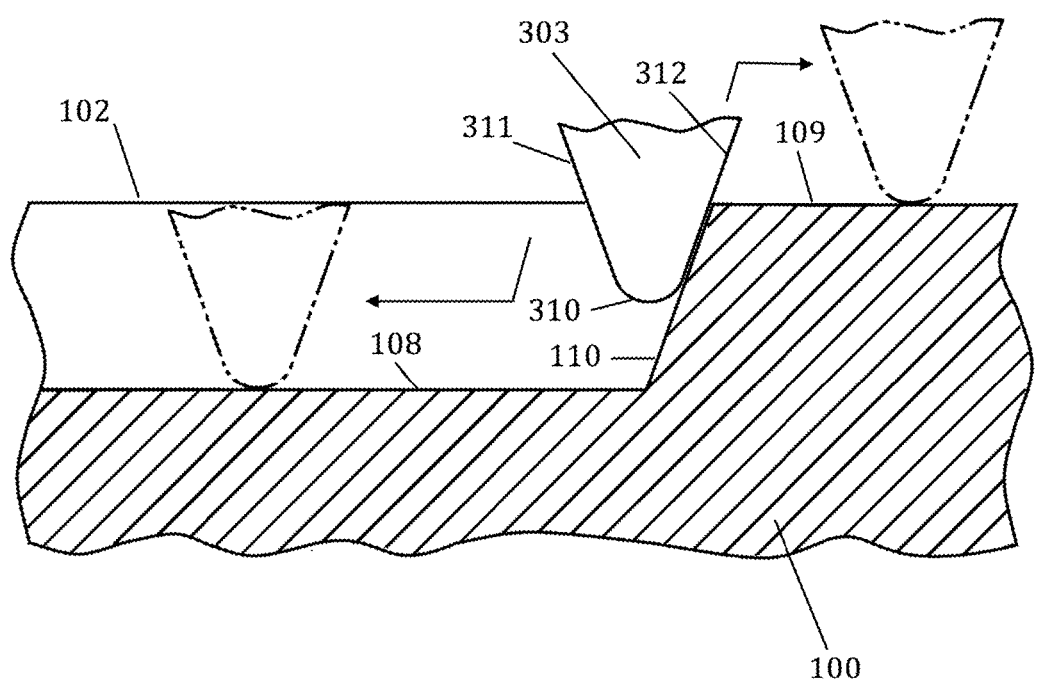
FIG. 8 is a partial sectional view of the tactile measuring instrument in FIG. 1 illustrating the movement of a tooth between two resting positions.

FIG. 8 is a partial sectional view of the first embodiment illustrating the movement of teeth 303 between their two resting positions, lands 108 and benches 109, on track 102. In the first embodiment, teeth 303 are triangular prisms, each with one rounded edge 310 and two flat faces 311 and 312. A cross-section of track 102 may contain multiple lands 108 and benches 109. Along a row in a track, adjacent lands 108 and benches 109 are connected by inclined planes 110. When a tooth 303 is at rest, rounded edge 310 touches either a land 108 or a bench 109. When tooth 303 changes position between land 108 and bench 109, flat face 311 or 312, depending on direction of motion, touches inclined plane 110 and moves along it. In the first embodiment, flat faces 310 and 311 have the same slopes as inclined planes 110. Therefore, as tooth 303 moves between land 108 and bench 109, it moves at an angle determined by the slope of inclined plane 110. The slope of inclined plane 110 affects the speed with which Braille pins 301 change states between the upward and downward positions. It also affects the force required to move sliding jaw 200 along guide 100. In alternative designs, not shown, the shape and geometry of teeth may be spherical, conical, cylindrical or another appropriate profile. Also, the inclined planes may have varying slopes or may be rounded.

Figure 9A:
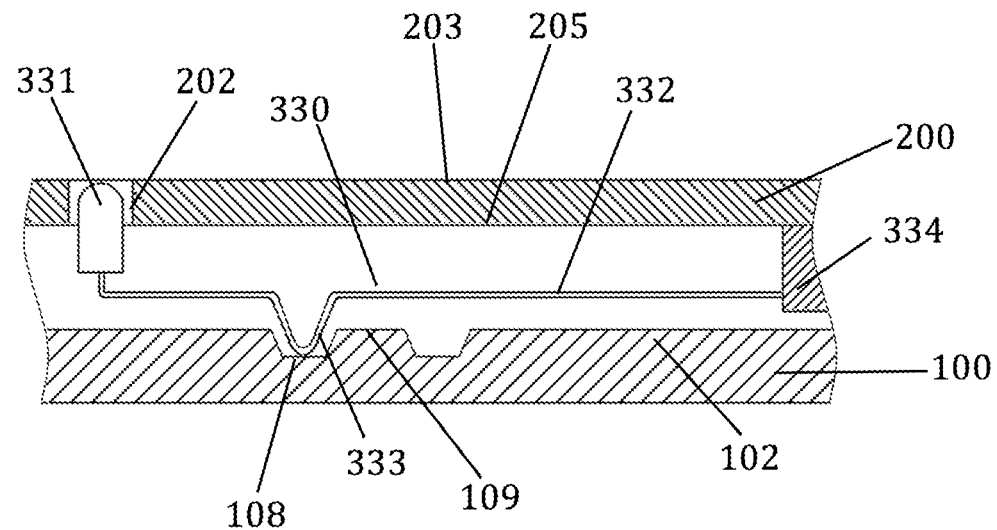
FIG. 9A is a partial sectional view showing an alternative design of display mechanism with a Braille pin in downward state.
Figure 9B:
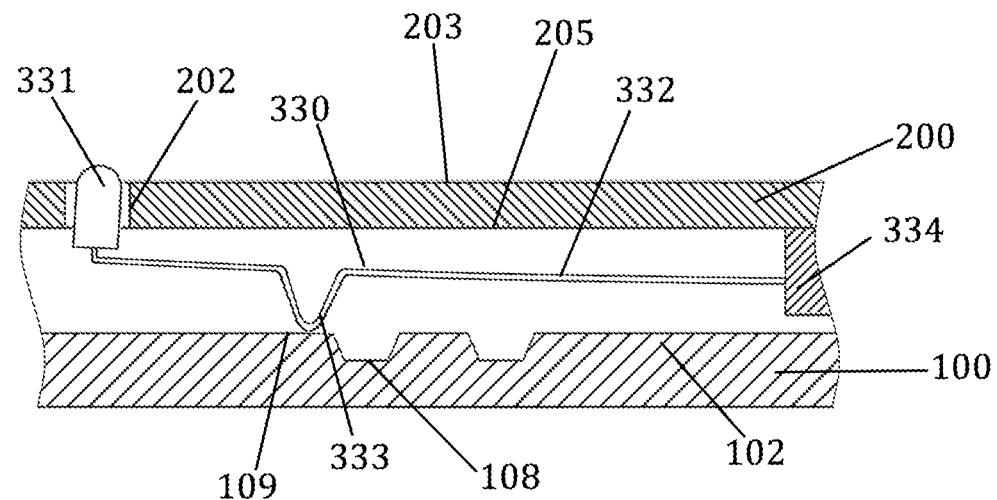
FIG. 9B is a partial sectional view showing display mechanism of FIG. 8A with a Braille pin in upward state.

FIGS. 9A and 9B illustrate the working of an alternative design of the display mechanism. Similar to display mechanism 300 of the first embodiment, display mechanism 330 is composed of Braille pins 331, members 332, teeth 333 and base 334. In contrast to members 302, members 332 may have a circular cross-section and are preferably made out of a wire. Teeth 333 are parts of respective members 332 and are formed by appropriate plastic deformation or shaping of the wires. Functionally similar to mechanism 300, mechanism 330 operates by bending of compliant members 332 according to their stiffness and geometry. In alternative designs, not shown, display mechanism 330 may constitute of compliant members made of different materials or combination of materials and with constant or varying cross-section shapes and areas.

Figure 10A:
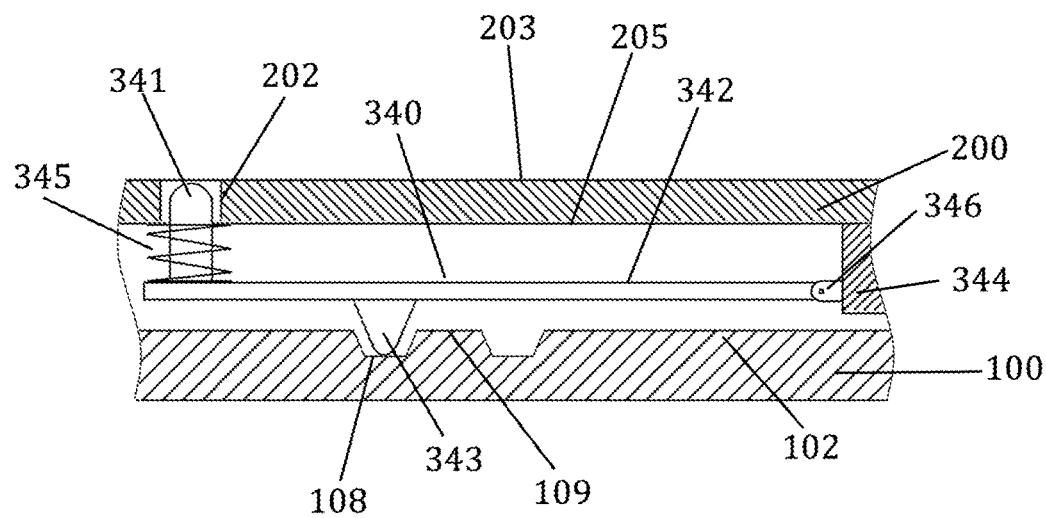
FIG. 10A is a partial sectional view showing another alternative design of display mechanism with a Braille pin in downward state.
Figure 10B:
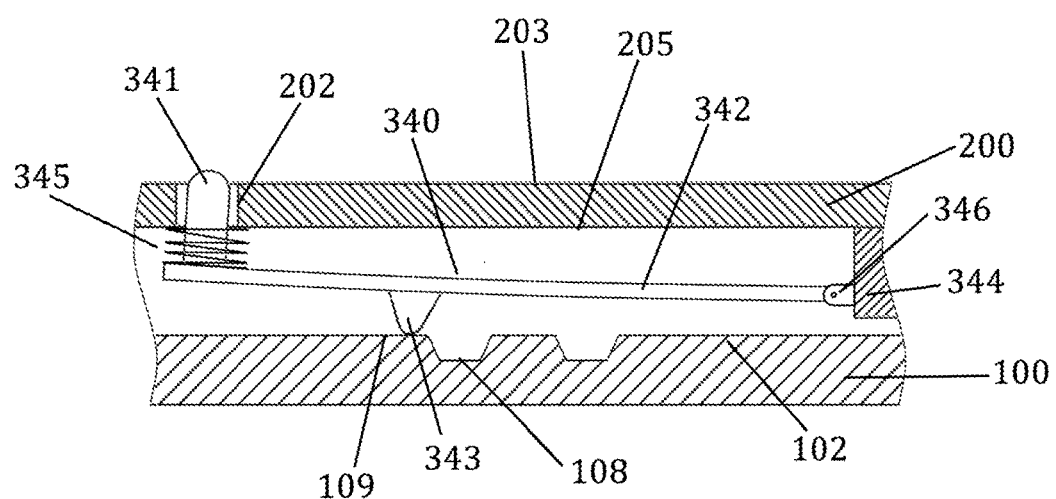
FIG. 10B is a partial sectional view showing display mechanism of FIG. 9A with a Braille pin in upward state.

FIGS. 10A and 10B illustrate the working of another alternative design of the display mechanism. Similar to display mechanism 300 of the first embodiment, display mechanism 340 is composed of Braille pins 341, members 342, teeth 343 and base 344. In contrast to members 302, mechanism 340 has revolute joints 346 between members 342 and base 344. Helical compression springs 345 are placed between members 342 and bottom surface 205 of sliding jaw 200. Functionally similar to mechanism 300, mechanism 340 operates by rotation of members 342 about respective revolute joints 346 according to their geometry and the stiffness of springs 345.

Figure 11A:
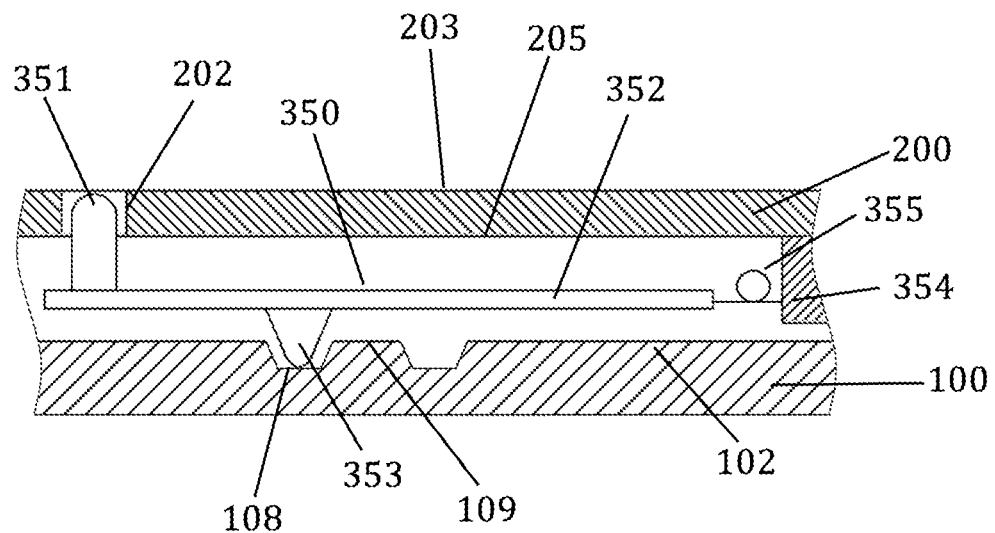
FIG. 11A is a partial sectional view showing yet another alternative design of display mechanism with a Braille pin in downward state.
Figure 11B:
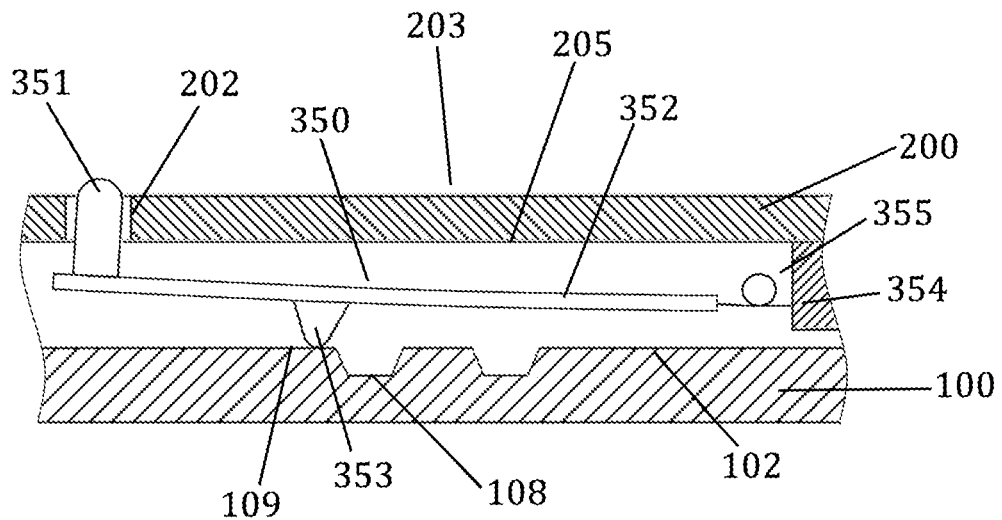
FIG. 11B is a partial sectional view showing display mechanism of FIG. 10A with a Braille pin in upward state.

FIGS. 11A and 11B illustrate the working of yet another alternative design of the display mechanism. Similar to display mechanism 300 of the first embodiment, display mechanism 350 is composed of Braille pins 351, members 352, teeth 353 and base 354. However, members 352 and base 354 are coupled via torsion springs 355 rather than revolute or rigid joints. Functionally similar to mechanism 300, mechanism 350 operates by movement of members 352 according to their geometry and the stiffness of springs 355. Still other embodiments, not shown, of the display mechanism may have combinations of rigid and compliant members, helical and torsion springs and attached or separate Braille dots.

Figure 12:
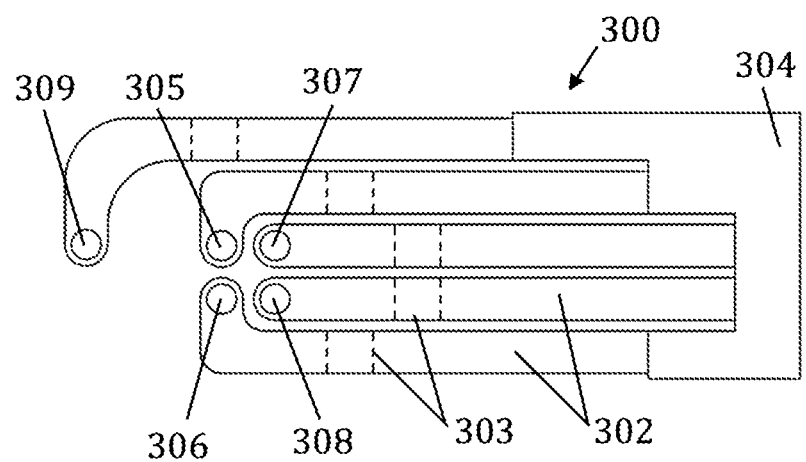
FIG. 12 is an orthographic projection in top view of display mechanism of the tactile measuring instrument in FIG. 1.
Figure 13:
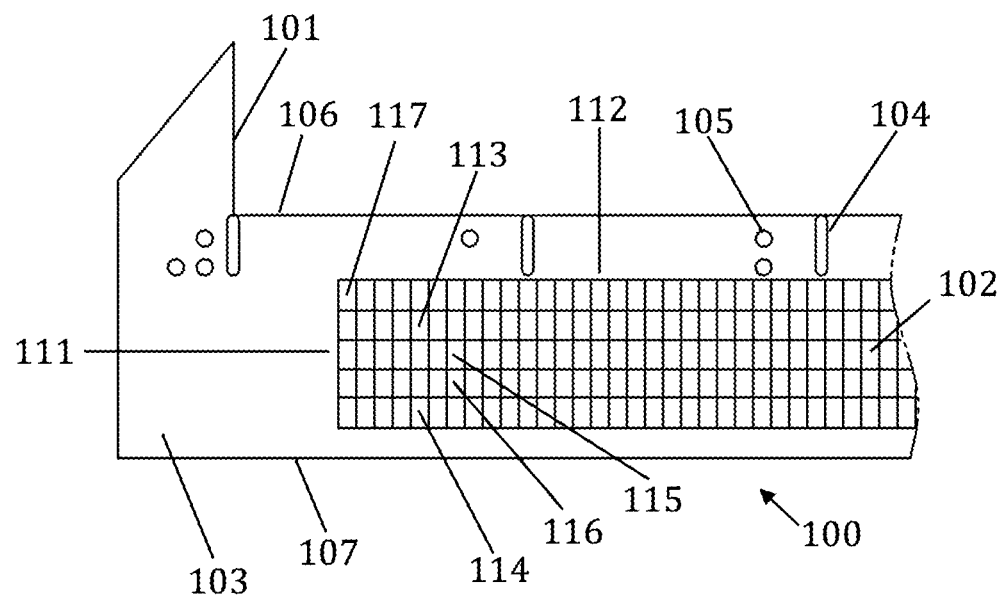
FIG. 13 is an illustration of virtual division of a track into rows and columns for the tactile measuring instrument in FIG. 1.

FIG. 12 is an orthographic projection in top view of display mechanism 300 of the first embodiment. Members 302 are connected with teeth 303 and Braille pins 305-309, respectively. All members 302 are connected with a common base 304. FIG. 13 illustrates virtual division of track 102 into rows 111 and columns 112. Width of individual virtual columns 112 is equal to the least count of the instrument. In the first embodiment, their width is equal to one-sixteenth of an inch. Widths of virtual rows 111 are such that they accommodate the widths of teeth 303 of display mechanism 300. When assembled, as in FIG. 2, display mechanism 300 is over guide 100 and teeth 303 rest on track 102. Each tooth 303 occupies one virtual row 111 and moves along it as sliding jaw 200 moves with respect to guide 100. Virtual rectangles 113-117 on track 102 in FIG. 13 illustrate the positions at which teeth 303 contact track 102 for one position of sliding jaw 200. Either a land 108 or a bench 109 is created in individual virtual rectangles 113-117 to thereby display a number appropriate for that position of sliding jaw 200.

Figure 14:
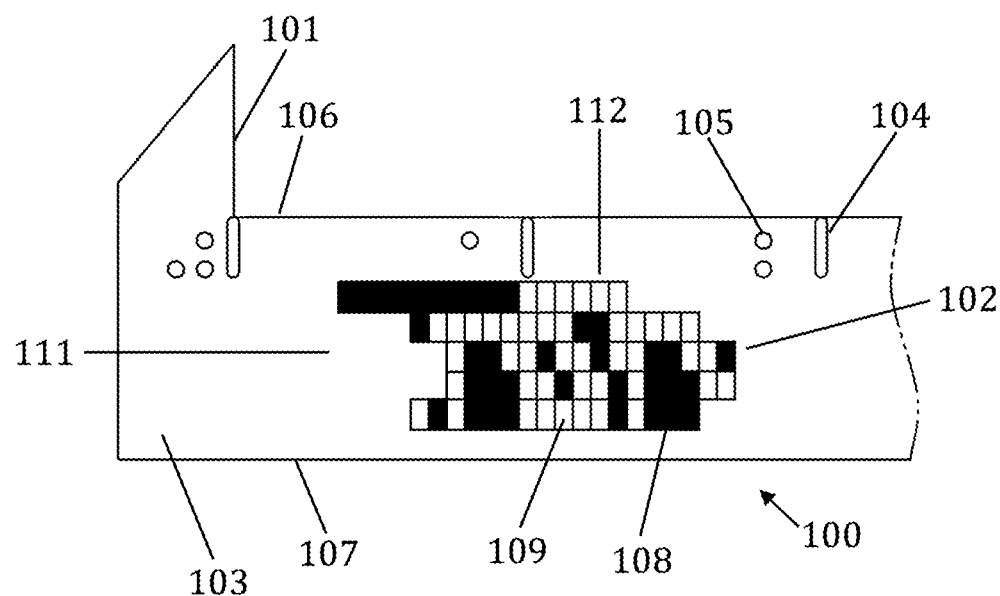
FIG. 14 is an illustration of virtual division of the track into rows and columns, and the layout of lands and benches for the tactile measuring instrument in FIG. 1.

In the first embodiment, for change in measurement by one inch, starting from an absolute inch, the numerator of the fine measurement displayed on display surface 203 changes from zero to fifteen and starts again at zero. FIG. 14 illustrates the part of track 102 that, as per the first embodiment, is responsible for determining the display of fine measurements in Braille for measurements between zero and one inch. The figure illustrates virtual division of track 102 into rows 111 and columns 112. Since all teeth 303 are not in one column, as illustrated in FIG. 13, rows 111 are offset from each other. The placement of lands 108 and benches 109 in each virtual rectangle in accordance with the first embodiment is also shown. The virtual rectangles that are darkened correspond to lands 108, and those that are not correspond to benches 109. The distribution of lands 108 and benches 109 in FIG. 14 represents the layout of track 102 for fine measurement between zero and one inch. The pattern is serially repeated for fine measurements between other inches.

Figure 15:
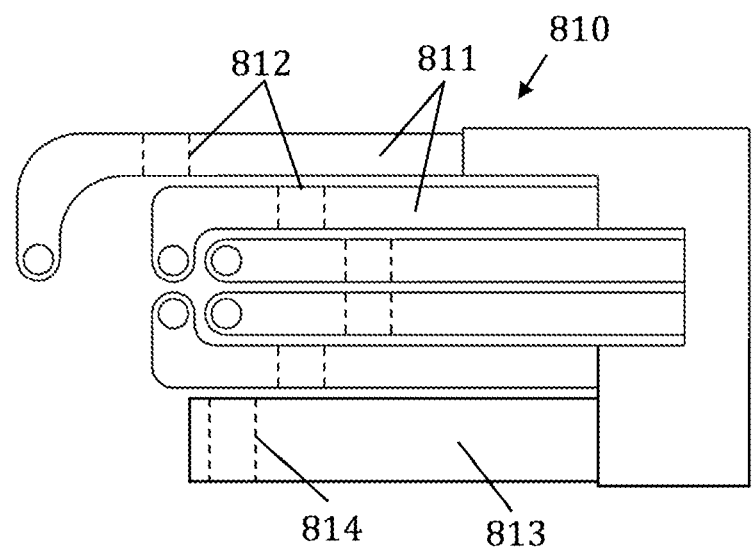
FIG. 15 is an orthographic projection in top view of still another alternative design of display mechanism.
Figure 16:
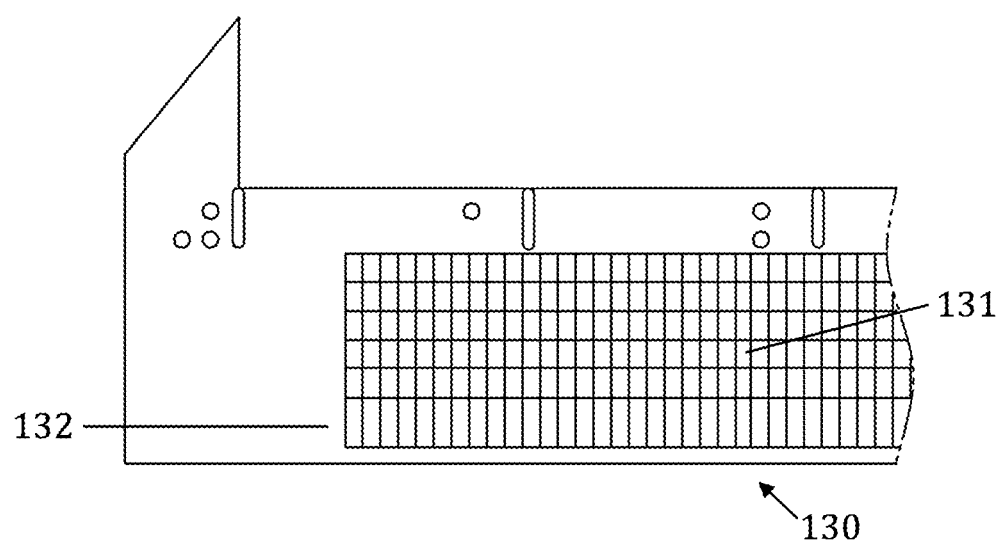
FIG. 16 is an illustration of virtual division of a track into rows and columns on a guide that is according to the display mechanism in FIG. 15.

FIG. 15 is an orthographic projection in top view of an alternative design of display mechanism. Although display mechanism 810 principally provides the same function as that provided by display mechanism 300 in the first embodiment, its additional features provide a higher accuracy to the instrument. Display mechanism 810 has members 811, teeth 812, additional member 813 and additional tooth 814. Additional member 813 has no associated Braille pin and may differ from members 811 in shape, size, form, structure and material. Additional tooth 814 may differ from teeth 812 in shape and size. FIG. 16 is an illustration of virtual divisions of track 131 into rows and columns on guide 130, which is according to display mechanism 810. Track 131, illustrated with virtual divisions into rows and columns, has an additional row 132. Tooth 814 occupies row 132 and moves along it as the sliding jaw moves with respect to guide 130. Virtual columns divide row 132 into virtual rectangles. Each virtual rectangle in row 132 is a land, and walls, not shown, separate adjacent lands. Therefore, tooth 814 always rests on a land and moves over a separating wall to go to an adjacent land. When tooth 814 moves over a wall, strain of member 813 changes and so does its bending profile. The effect of this is that mechanism 810 resists continuous movement and tends to be more stable at discrete positions where tooth 814 rests over a land. Resistance offered by mechanism 810 and its stability at discrete positions principally depends on stiffness of member 813 to bending. Other factors including shape and size of tooth 814 and separating walls also affect resistance and stability. In addition to improving the precision of the instrument, the additional features make the instrument easier to control and use. The sound created by tooth 814 as it moves over separating walls may give an auditory cue to the user, thereby helping the user in operating it. Auditory cues, generated with every change of measurement, supplement the tactile output. This informs users of desired or undesired changes in measurement and thereby prevents errors.

Figure 17:
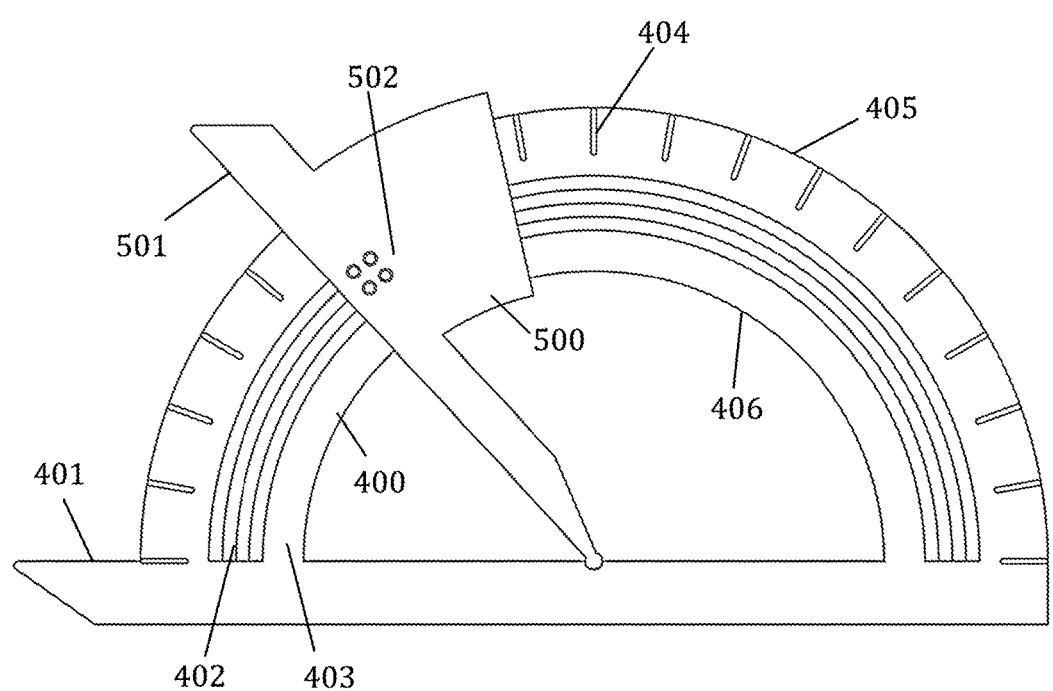
FIG. 17 is an orthographic projection in top view of a tactile measuring instrument formed as a linkage of a rigid angular guide and a sliding jaw in accordance with another embodiment.

Second embodiment of the present invention is an instrument to measure angles between straight lines or to draw straight lines at known angles between them. FIG. 17 is an orthographic projection in top view of this embodiment illustrating a linkage between rigid angular guide 400 and sliding jaw 500 shown with a non-zero angle between measuring contact 401 of guide 400 and measuring contact 501 of sliding jaw 500. Display mechanism, not shown, is attached to sliding jaw 500 and is in physical contact with track 402 on top surface 403 of guide 400. Tactile markings or divisions 404 are marked on top surface 403 along outer edge 405. Braille characters, not shown, may accompany individual tactile markings In an alternative design of second embodiment, not shown, the divisions may be along inner edge 406. In the second embodiment, angles are measured in degrees. Coarse measurements are in multiples of ten degrees and fine measurements in whole degrees. Alternative designs, not shown, may have different units and least counts of coarse and fine measurements. In the second embodiment, coarse measurements are read from top surface 403 of guide 400 and fine measurements are read from display surface 502 of sliding jaw 500. Alternative designs, not shown, may have both coarse and fine measurements read from the display surface of the sliding jaw.

The display mechanism, not shown, and track 402 in the second embodiment is similar to display mechanism 300 and track 102 of the first embodiment, but with obvious differences according to difference in units and sliding motion. Layout of lands and benches on track 402 is not shown in FIG. 17. However, that should be obvious to a person skilled with the teaching provided of the same for the first embodiment. Operation of the measuring instrument in the second embodiment is similar to the operation of the measuring instrument of the first embodiment with obvious differences according to design.

Figure 18:
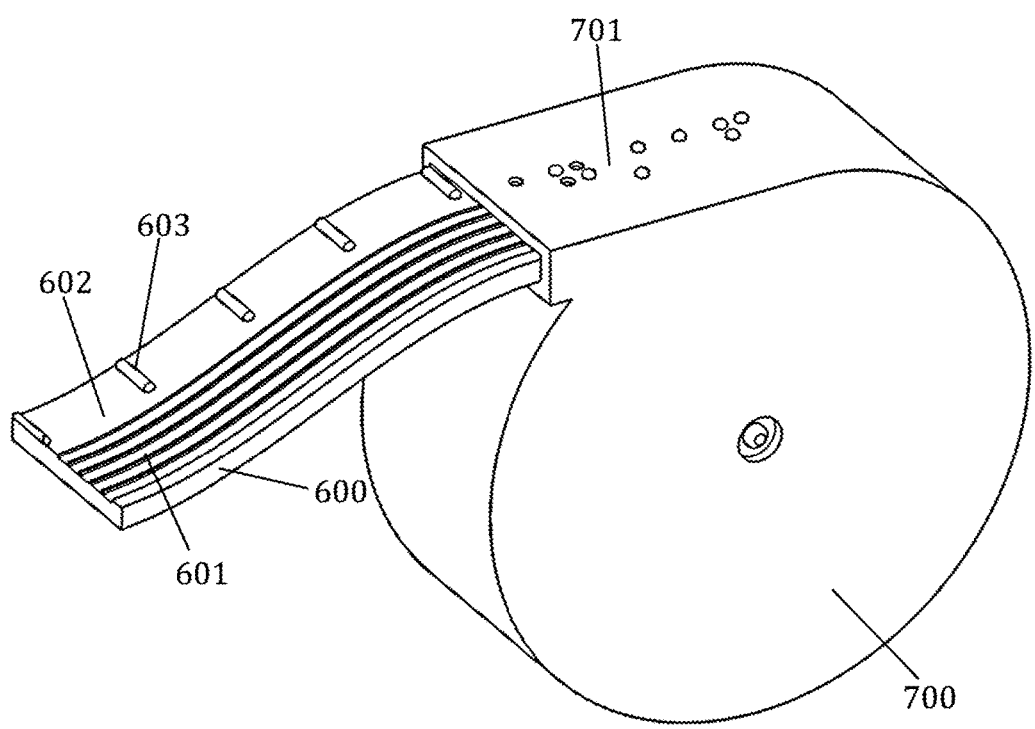
FIG. 18 is a perspective view of a tactile measuring instrument formed as a linkage of a sliding measuring tape and a housing in accordance with yet another embodiment.

Third embodiment of the present invention is an instrument similar to a tape measure for measurement of length along non-uniform lines. FIG. 18 is a perspective view of this embodiment illustrating a sliding measuring tape 600, and a housing 700 with a part of tape 600 outside housing 700 and the rest, not shown, coiled inside it. Display mechanism, not shown, is linked to housing 700 and is in physical contact with track 601 on top surface 602 of tape 600. Tactile markings or divisions 603 are marked on top surface 602. Braille characters, not shown, may accompany individual tactile markings Coarse measurements are read from top surface 602 of tape 600 and fine measurements are read from display surface 701 of housing 700. Alternative designs, not shown, may have both coarse and fine measurements read from the display surface of the housing.

The scope of the present invention is not limited to the three embodiments of measuring instruments discussed so far. Other embodiments may relate to mechanical tactile displays to enable condensed representation of tactile forms on a surface, and to enable rendering of the said condensed representation to discernable tactile forms for a user to read or perceive. The tactile forms may be Braille characters or may be other forms, consisting of, but not limited to, dots, lines, shapes and textures. Embodiments may not be limited to measuring instruments alone. They may be of other devices with said mechanical tactile displays.

In the first embodiment, track 102 is a form of condensed representation of appropriate numerical digits on top surface 103 of guide 100. Display mechanism 300 enables rendering of the digits represented on track 102 to Braille characters on display surface 203 of sliding jaw 200. Other embodiments within the scope of the invention may have parts and structures that perform functions similar to those performed by track 102, display mechanism 300 and display surface 103 of the first embodiment, but may not be limited to them.

Figure 19A:
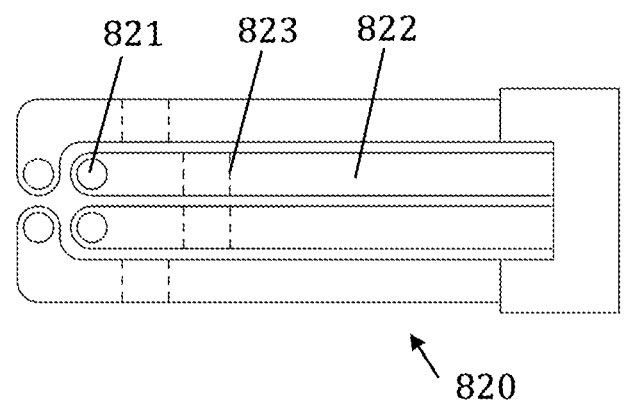
FIG. 19A is an orthographic projection in top view of a display mechanism for display of one character or symbol in Braille with maximum four dots.
Figure 19B:
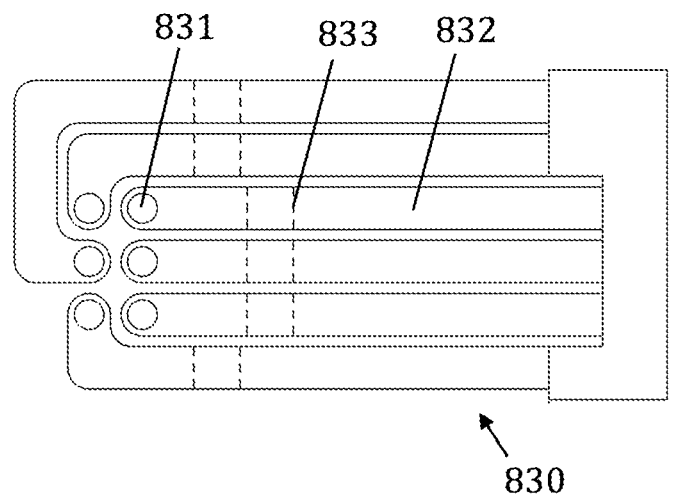
FIG. 19B is orthographic projection in top view of a display mechanism for display of one character or symbol in Braille with maximum six dots.
Figure 19C:
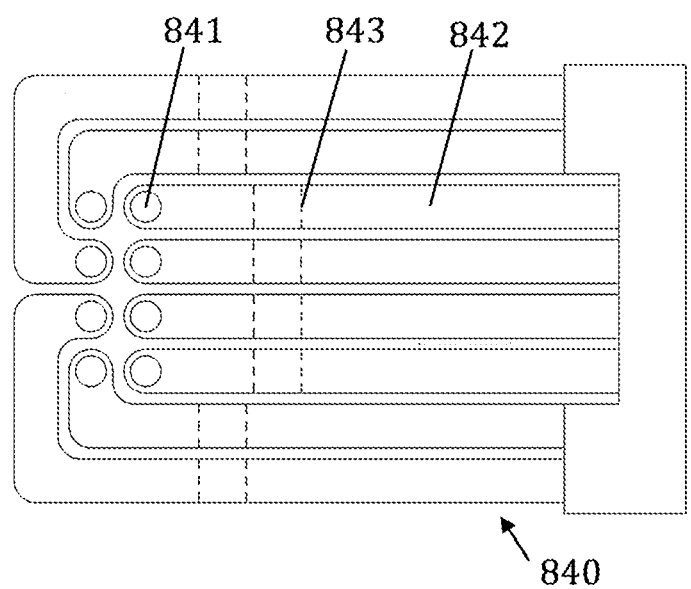
FIG. 19C is an orthographic projection in top view of a display mechanism for display of one character or symbol in Braille with maximum eight dots.

The design of a display mechanism is according to the tactile forms that are to be displayed. In the first, second and third embodiments, the design of respective display mechanisms is according to display of numerical digits in Braille. FIG. 19A shows display mechanism 820 meant for display of any digit ranging from zero to nine in Braille. Four members 822 are attached to four Braille pins 821 and four teeth 823. FIG. 19B shows a display mechanism 830 according to display of any character or symbol in Braille, according to standards that use a maximum of six dots per character. Six members 832 are attached to six Braille pins 831 and six teeth 833. FIG. 19C shows a display mechanism 840 meant for display of any character or symbol in Braille, according to standards that use maximum eight dots per character. Eight members 842 are attached to eight Braille pins 841 and eight teeth 843.

Figure 20A:
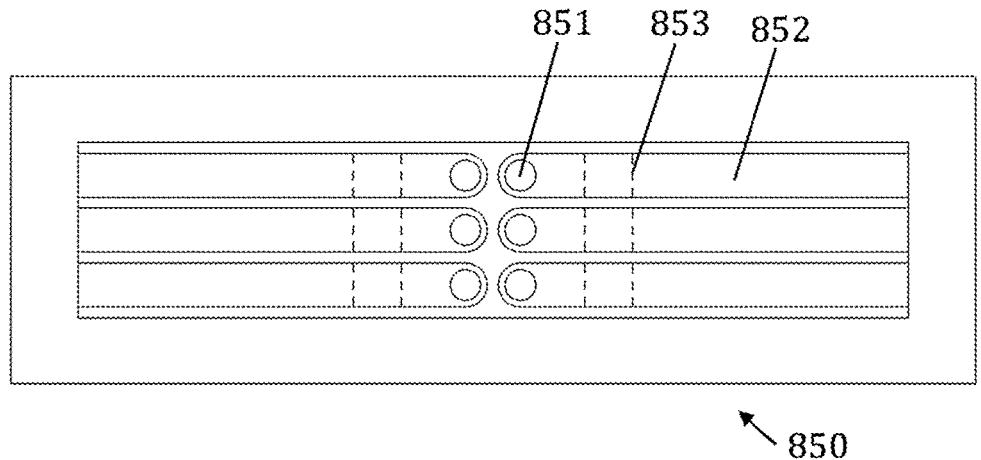
FIG. 20A is an orthographic projection in top view of another display mechanism for display of a character or symbol in Braille with maximum six dots.
Figure 20B:
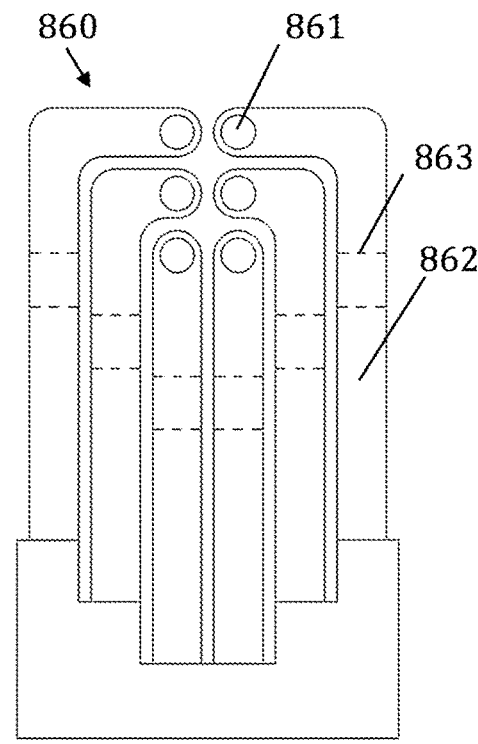
FIG. 20B is an orthographic projection in top view of yet another display mechanism for display of a character or symbol in Braille with maximum six dots.
Figure 20C:
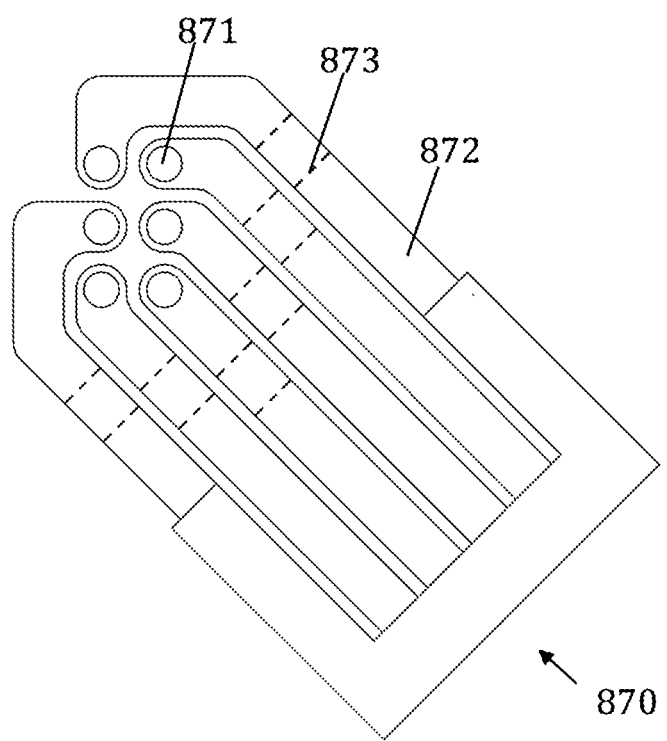
FIG. 20C is an orthographic projection in top view of still another display mechanism for display of a character or symbol in Braille with maximum six dots.

The design of a display mechanism is also according to space available, direction of motion and layout of condensed tactile forms. FIG. 20A shows a display mechanism 850. Six members 852 are attached to six Braille pins 851 and six teeth 853. FIG. 20B shows a display mechanism 860. Six members 862 are attached to six Braille pins 861 and six teeth 863. FIG. 20C shows a display mechanism 870. Six members 872 are attached to six Braille pins 871 and six teeth 873. Like mechanism 830 in FIG. 19B, mechanisms 850, 860 and 870 are also for display of characters or symbols in Braille with maximum six dots per character. Space available, direction of motion and layout of condensed tactile forms may govern which of these or other designs are best suited for a particular application.

Figure 21A:
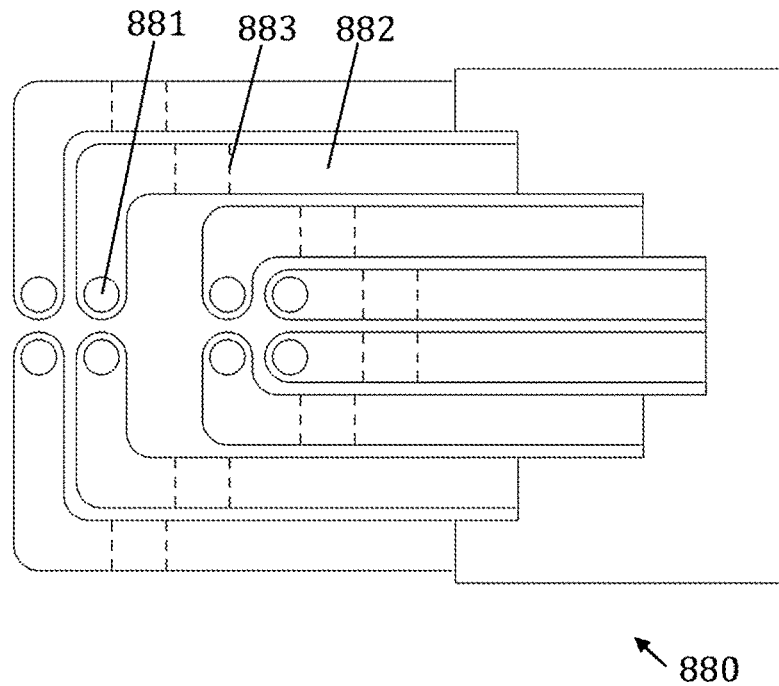
FIG. 21A is an orthographic projection in top view of a display mechanism for display of two adjacent characters or symbols in Braille with maximum four dots each.
Figure 21B:
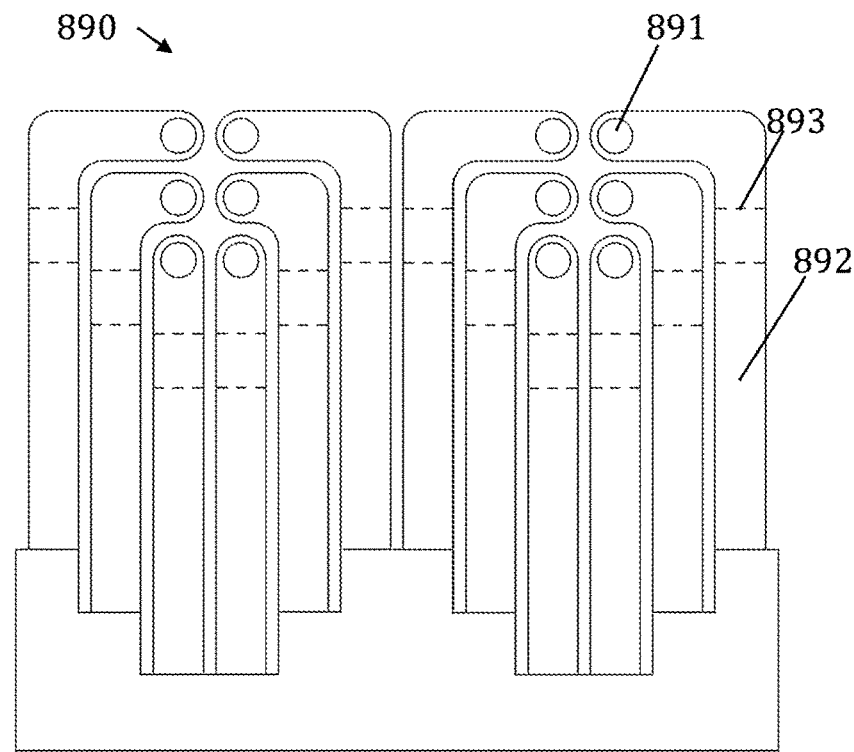
FIG. 21B is an orthographic projection in top view of a display mechanism for display of two adjacent characters or symbols in Braille with maximum six dots each.

FIG. 21A shows a display mechanism 880 meant for display of two adjacent numerical digits, each ranging from zero to nine, in Braille. Eight members 882 are attached to eight Braille pins 881 and eight teeth 883. Other designs, not shown, may be according to display of more than two digits in Braille. FIG. 21B shows a display mechanism 890 meant for display of two adjacent characters or symbols in Braille with maximum six dots per character. Twelve members 892 are attached to twelve Braille pins 891 and twelve teeth 893. Other designs, not shown, may be according to display of more than two adjacent characters in Braille.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination. Further modifications of the invention will also occur to persons skilled in the art and all such are deemed to fall within the spirit and scope of the invention.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

We claim:

1. A measuring instrument having a range of measurement, comprising:
   a. a guide spanning the range of measurement of said measuring instrument,
   b. a sliding jaw, comprising a display surface, configured to slide along said guide for adjusting said measuring instrument to a desired measurement, and
   c. means, mounted under said sliding jaw, for mechanical display of the value of said desired measurement in a form perceivable to touch on the display surface of said sliding jaw,
   whereby said measuring instrument can be used to measure or create geometric features with the use of touch.

2. A measuring instrument as in claim 1, wherein said desired measurement is of length and said guide is linear.

3. A measuring instrument as in claim 1, wherein said desired measurement is of angle and said guide is angular.

4. A measuring instrument as in claim 1, wherein the value of said desired measurement is displayed in Braille.

5. A measuring instrument as in claim 1, wherein a coarse part of said desired measurement is indicated using tactile divisions on said guide.

6. A measuring instrument as in claim 1, wherein a fine part of said desired measurement is indicated as a fraction, of which the denominator is permanently embossed on said display surface.

7. A measuring instrument as in claim 1, wherein said guide comprises a track that interacts with said means for mechanical display.

8. A measuring instrument as in claim 7, wherein said track comprises a plurality of elevations and depressions.

9. A measuring instrument as in claim 1, wherein said means for mechanical display comprises a plurality of members, each connected to a tooth and a Braille dot.

10. A measuring instrument as in claim 1, further including means for causing said sliding jaw to resist continuous movement and to be stable at discrete positions.

11. A measuring instrument as in claim 1, further including means for generating auditory cues with change of said desired measurement.

12. A tactile display, comprising:
   a. a first body with condensed representation of tactile forms on a surface,
   b. a second body, comprising a display surface, configured to slide over said first body, and c. means, mounted under said second body, for mechanical display of tactile forms on said display surface from said condensed representation, whereby said tactile display can be used in a mechanical device for presenting information that may be perceived and read with the use of touch.

13. A tactile display as in claim 12, wherein said means for mechanical display comprise a plurality of members, each connected to a tooth and a unitary tactile feature.

14. A tactile display as in claim 13, wherein said unitary tactile features are Braille dots and said tactile forms are Braille characters.

15. A tactile display as in claim 13, wherein said members are compliant to deformation.

16. A tactile display as in claim 13, wherein said means for mechanical display further comprises springs connected to said members.

17. A tactile display as in claim 12, wherein said means for mechanical display comprise a plurality of members with predetermined bends and twists along their length.

18. A tactile display as in claim 12, further including means for causing said second body to resist continuous movement and to be stable at discrete positions.

19. A tactile display as in claim 12, further including means for generating auditory cues with change of said tactile forms.

\* \* \* \* \*